Patented May 12, 1925.

1,537,406

UNITED STATES PATENT OFFICE.

GERALD OTLEY CASE AND JAMES RANKIN GARROW, OF LONDON, ENGLAND, ASSIGNORS TO NOVOCRETES LIMITED, OF LONDON, ENGLAND.

PROCESS OF MAKING COMPOSITIONS OF FIBROUS MATERIALS AND CEMENT.

No Drawing.      Application filed October 18, 1924. Serial No. 744,510.

*To all whom it may concern:*

Be it known that we, GERALD OTLEY CASE and JAMES RANKIN GARROW, subjects of the King of Great Britain, residing at 1-3 Regent Street, London, S. W. 1, England, have invented certain new and useful Improvements in Processes of Making Compositions of Fibrous Materials and Cement, of which the following is a specification.

This invention relates to the manufacture of blocks, slabs, or panels for building and other purposes.

According to the present invention a fibrous material, such as sawdust, is saturated and then mixed with a substance or compound, which after re-acting with the damping liquid, produces an insoluble compound in and on the material. Cement is then added to the mixture so as to be well distributed therein, and pressure is applied, whereon the liquid remaining in the sawdust is brought into contact with the cement so that a setting action is initiated; the pressure is then maintained until the slab is formed.

A solution of metallic chloride may be used as the damping liquid, and the substance added to the saturated sawdust may be hydrate of lime. Particularly, ferric chloride may be used with the lime. Alternatively, calcium chloride may be used as the damping liquid and sodium carbonate as the added substance.

Further, magnesium chloride may be used as the damping liquid, and hydrate of lime or sodium carbonate as the added substance. The cement used in any of the above-mentioned mixtures may be Portland cement.

If the sawdust is from a particularly hard wood, a little water may be added before the pressing operation in order to initiate the setting action of the cement.

In will be noted that in processes according to the present invention a mineralizing step is succeeded by a setting step, even though the steps are quickly successive, for instance, when the said substance is added to the saturated sawdust an insoluble compound is formed in and on the sawdust and setting does not take place. nor is it even initiated, but when this mineralized sawdust is mixed with the Portland cement and the pressure is applied to express the water from the sawdust the setting step commences on the water reaching the cement.

In one practical embodiment of the present invention sawdust is saturated with water, and then the hydrate of lime in the proportion of one-tenth to one-twenty-fifth of the sawdust is added. The added substance reacting with the water ultimately produces an insoluble compound in the sawdust particles. To the mixture is then added Portland cement, and the whole is subjected to pressure, whereon the excess of water in the sawdust is expressed and brought into contact with the cement so that a setting action is initiated.

Instead of using water with the proportion of hydrate of lime mentioned a metallic chloride or nitrate may be used as the damping liquid, stronger and quicker results being obtained.

Additionally, it may be mentioned that instead of using calcium hydrate, chemically equivalent proportions of other mineralizing agents may be used with the chloride or nitrate solutions referred to, for instance, sodium carbonate, calcium carbonate, or magnesium carbonate or oxide may be used for the calcium hydrate.

A practical embodiment involving the use of metallic chloride is as follows:—

A solution of 10% calcium chloride is used to damp the sawdust and then dry sodium carbonate is the substance added to the damp sawdust, the carbonate being in a proportion of about twice the weight of chloride used. The Portland cement is then added to the mixture and subjected to pressure.

In another practical embodiment of the invention a 10% solution of ferric chloride or nitrate is utilized to saturate the sawdust, and then the saturated sawdust is mixed with calcium hydrate, the proportion of the latter being about one-twentieth of the volume of the sawdust. The Portland cement is then added and the whole subjected to pressure.

Instead of using a ferric chloride, magnesium chloride or calcium chloride may be used. Particularly, it may be mentioned that when a 10% solution of magnesium chloride is used the added substance, instead of being calcium hydrate, can be sodium carbonate.

We claim:—

1. A process for utilizing fibrous materials in conjunction with cement, which consists in saturating the said material and then mixing the damp saturated material with a substance, which after re-acting with the damping liquid produces an insoluble compound in and on the material, and adding cement to the mixture, then subjecting the whole to pressure, whereby liquid remaining in the material is brought into contact with the cement and a "setting" action initiated.

2. A process for utilizing fibrous materials in conjunction with cement which consists in saturating the said material with a solution of metallic salt, and then mixing the damp saturated material with a substance, which after re-acting with the damping liquid produces an insoluble compound in and on the material, and adding cement to the mixture, then subjecting the whole to pressure, whereby liquid remaining in the material is brought into contact with the cement and a "setting" action initiated.

3. A process for utilizing fibrous materials in conjunction with cement which consists in saturating said material with a solution of metallic chloride, and then mixing the damp saturated material with a substance which after re-acting with the damping liquid produces an insoluble compound in and on the material, and adding cement to the mixture, then subjecting the whole to pressure whereby liquid remaining in the material is brought into contact with the cement and a "setting" action initiated.

4. A process for utilizing fibrous materials in conjunction with cement which consists in saturating the said material with a solution of a ferric chloride, and then mixing the damp saturated material with a substance which after re-acting with the damping liquid produces an insoluble compound in and on the material, and adding cement to the mixture, then subjecting the whole to pressure, whereby liquid remaining in the material is brought into contact with the cement, and a "setting" action initiated.

5. A process for utilizing fibrous materials in conjunction with cement, which consists in saturating the said material and then mixing the damp saturated material with an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

6. A process for utilizing fibrous materials in conjunction with cement, which consists in saturating the said material and then mixing the damp saturated material with the hydrate of an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

7. A process for utilizing fibrous materials in conjunction with cement which consists in saturating said material and then mixing the damp saturated material with calcium hydrate, which after re-acting with the damping liquid produces an insoluble compound in and on the material, and adding cement to the mixture, and then subjecting the whole to pressure, whereby liquid remaining in the material is brought into contact with the cement and a "setting" action initiated.

8. A process for utilizing sawdust in conjunction with cement which consists in saturating said sawdust and then mixing the damp saturated sawdust with calcium hydrate, which after re-acting with the damping liquid produces an insoluble compound in and on the sawdust, and adding cement to the mixture, and then subjecting the whole to pressure, whereby liquid remaining in the sawdust is brought into contact with the cement and a "setting" action initiated.

9. A process for utilizing fibrous materials in conjunction with cement which consists in saturating said material with a solution of a metallic salt, and then mixing the damp saturated material with an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

10. A process for utilizing fibrous materials in conjunction with cement which consists in saturating the said material with a solution of a metallic chloride, and then mixing the damp saturated material with an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

11. A process for utilizing fibrous materials in conjunction with cement which consists in saturating the said material with a solution of ferric chloride, and then mixing the damp saturated material with an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

12. A process for utilizing fibrous materials in conjunction with cement which consists in saturating the said material with a solution of a metallic salt and then mixing the damp saturated material with calcium hydrate, which after re-acting with the damp liquid produces an insoluble compound in and on the material, and adding cement to the mixture, and then subjecting the whole to pressure, whereby liquid remaining in the material is brought into contact with the cement and a "setting" action initiated.

13. A process for utilizing fibrous materials in conjunction with cement which consists in saturating the said material with a metallic chloride and then mixing the damp saturated material with calcium hydrate, which after re-acting with the damp liquid produces an insoluble compound in and on the material, and adding cement to the mixture, and then subjecting the whole to pressure, whereby liquid remaining in the material is brought into contact with the cement and a "setting" action initiated.

14. A process for utilizing fibrous materials in conjunction wih cement which consists in saturating the said material with a solution of ferric chloride and then mixing the damp saturated material with calcium hydrate, which after re-acting with the damp liquid produces an insoluble compound in and on the material, and adding cement to the mixture, and then subjecting the whole to pressure, whereby liquid remaining in the material is brought into contact with the cement and a "setting" action initiated.

15. A process for utilizing sawdust in conjunction with cement which consists in saturating the said sawdust with a solution of ferric chloride and then mixing the damp saturated sawdust with calcium hydrate, which after re-acting with the damp liquid produces an insoluble compound in and on the sawdust, and adding cement to the mixture, and then subjecting the whole to pressure, whereby liquid remaining in the sawdust is brought into contact with the cement and a "setting" action initiated.

16. A process for utilizing fibrous materials in conjunction with cement which consists in saturating the said material with a 10% solution of a metallic salt, and mixing the damp saturated material with an alkaline substance, which after re-acting with the damp liquid produces an insoluble compound in and on the material, and adding cement to the mixture, and then subjecting the whole to pressure, whereby liquid remaining in the material is brought into contact with the cement and a "setting" action initiated.

17. A process for utilizing fibrous materials in conjunction with cement which consists in saturating the said material with a 10% solution of ferric chloride and then mixing the damp saturated material with an alkaline substance, which after re-acting with the damping liquid produces an insoluble compound in and on the material, and adding cement to the mixture, and then subjecting the whole to pressure, whereby liquid remaining in the material is brought into contact with the cement and a "setting" action initiated.

18. A process for utilizing fibrous materials in conjunction with cement which consists in saturating the said material with a 10% solution of a metallic chloride and then mixing the damp saturated material with an alkaline substance in the proportion of one-twentieth by volume of the fibrous material, which substance, after re-acting with the damping liquid, produces an insoluble compound in and on the material, and adding cement to the mixture, and then subjecting the whole to pressure, whereby liquid remaining in the material is brought into contact with the cement and a "setting" action initiated.

19. A process for utilizing fibrous materials in conjunction with cement which consists in saturating the said material with a 10% solution of metallic chloride, and then mixing the damp saturated material with calcium hydrate in the proportion of one-twentieth by volume of the fibrous material, which calcium hydrate, after re-acting with the damping liquid, produces an insoluble compound in and on the material, and adding cement to the mixture, and then subjecting the whole to pressure, whereby liquid remaining in the material is brought into contact with the cement and a "setting" action initiated.

20. A process for utilizing fibrous materials in conjunction with cement which consists in saturating the said material with a 10% solution of ferric chloride, and then mixing the damp saturated material with calcium hydrate in the proportion of one-twentieth by volume of the fibrous material, which calcium hydrate, after re-acting with the damping liquid, produces an insoluble compound in and on the material, and adding cement to the mixture, and then subjecting the whole to pressure, whereby liquid remaining in the material is brought into contact with the cement and a "setting" action initiated.

21. A process for utilizing sawdust in conjunction with cement which consists in saturating the said sawdust with a 10% solution of ferric chloride, and then mixing the damp saturated sawdust with calcium hydrate in the proportion of one-twentieth by volume of the sawdust, which calcium hydrate, after re-acting with the damping liquid, produces an insoluble compound in and on the sawdust, and adding cement to the mixture and then subjecting the whole to pressure, whereby liquid remaining in the sawdust is brought into contact with the cement and a "setting" action initiated.

In testimony whereof we affix our signatures.

GERALD OTLEY CASE.
JAMES RANKIN GARROW.